US012639741B2

(12) United States Patent
Hashimoto et al.

(10) Patent No.: US 12,639,741 B2
(45) Date of Patent: May 26, 2026

(54) INFORMATION PROCESSING DEVICE, METHOD FOR GENERATING LEARNING MODEL, AND COMPUTER-READABLE STORAGE MEDIUM THAT STORES PROGRAM FOR GENERATING LEARNING MODEL

(71) Applicant: Rakuten Group, Inc., Tokyo (JP)

(72) Inventors: Chikara Hashimoto, Tokyo (JP); Gautam Kumar, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 183 days.

(21) Appl. No.: 18/457,777

(22) Filed: Aug. 29, 2023

(65) Prior Publication Data

US 2024/0070753 A1     Feb. 29, 2024

(30) Foreign Application Priority Data

Aug. 31, 2022     (JP) ................................. 2022-138288

(51) Int. Cl.
G06F 16/00         (2019.01)
G06Q 30/0601      (2023.01)

(52) U.S. Cl.
CPC ..... G06Q 30/0631 (2013.01); G06Q 30/0627 (2013.01)

(58) Field of Classification Search
CPC ........................... G06F 16/00; G06Q 30/0631
See application file for complete search history.

(56) References Cited

U.S. PATENT DOCUMENTS

2022/0254159 A1*   8/2022   Hara ..................... G06V 30/413
2022/0398643 A1*   12/2022   Sivakumar ............ G06F 18/217

FOREIGN PATENT DOCUMENTS

JP         2010-033377 A       2/2010
JP         2021-131862 A       9/2021

OTHER PUBLICATIONS

Machine translation of communication dated Apr. 1, 2026 in Japanese Application No. 2022-138288.

* cited by examiner

*Primary Examiner* — Cheryl Lewis
(74) *Attorney, Agent, or Firm* — Sughrue Mion, PLLC

(57) ABSTRACT

An information processing device that generates a learning model includes a processor and a memory. The memory stores target data. The learning model is configured to output attribute information of a target based on a search query that has been input to search for the target. The processor is configured to execute a process that updates some of parameters included in the learning model by giving the target data to one or more training tasks and executing the one or more training tasks.

12 Claims, 6 Drawing Sheets

| Title | Attribute::<br>Attribute Value | Genre Path |
|---|---|---|
| RKTN Running Wear Men's<br>DRY FIT UNLINED<br>Shorts Black x Gray<br>(RKTN439494-010)<br>Mens(Men's) RKTN<br>Training Pants | Color::Black<br>Representative Color::Gray<br>Brand Name::RKTN | Sports/Outdoors ><br>Jogging/Marathon ><br>Wear > Men's Wear |
| [Free Shipping]<br>Sc LTD Chic Flower Pink (Clear)<br>For Android<br>[Smartphone Case] [Hard Case]<br>Smartphone Case<br>Smartphone Cover | Representative Color::Pink<br>Smartphone/Tablet Case<br>Shape::Case | Smartphone/Tablet ><br>Smartphone/<br>Mobile Phone Accessories ><br>Case/Cover |
| • • • • • • • | • • • • • • • | • • • • • • •   P2 |
| • • • • • • • | • • • • • • • | • • • • • • • |
| • • • • • • • | • • • • • • • | • • • • • • • |

| Query | Attribute::<br>Attribute Value |
|---|---|
| MOSE SoundLink<br>Mini Speaker | Representative Color::Black<br>Brand Name::MOSE   S1 |
| Soba Noodles | Gross Weight::200-299g<br>Food Condition::Dried Noodles   S2 |
| • • • • • • • | • • • • • • • |
| • • • • • • • | • • • • • • • |
| • • • • • • • | • • • • • • •   Sq |

Fig.8
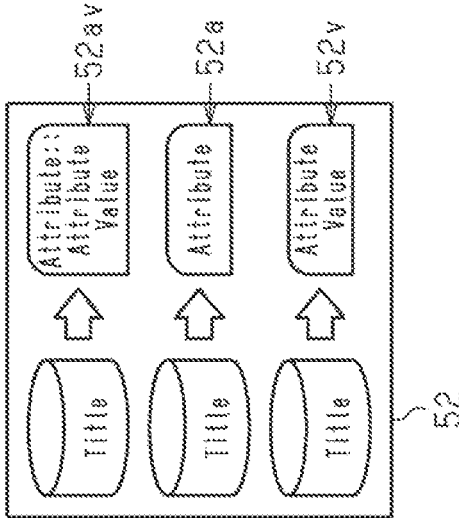
Fig.7
Fig.6
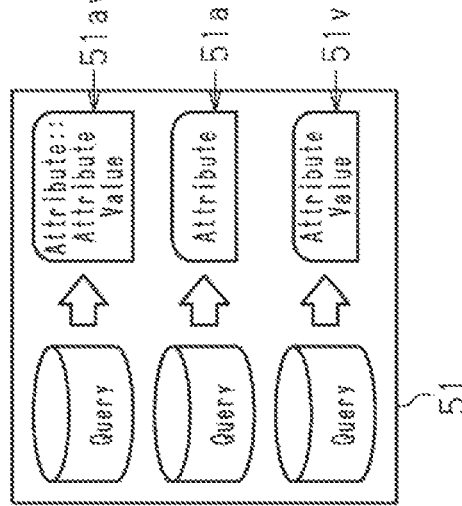

Start

Obtain target data ~S11

Obtain search data ~S12

Define task ~S13

Update parameters ~S14

End

| Experimental Example (Training Task) | Precision@1 | Recall@1 | F1@1 |
|---|---|---|---|
| 1(Search Query → Attribute::Attribute Value) | 0.336 | 0.1883 | 0.2414 |
| 2(Title → Attribute::Attribute Value) | 0.5294 | 0.2968 | 0.3803 |

Fig.11

| Experimental Example | Precision @1 | Recall @1 | F1 @1 | Precision @3 | Recall @3 | F1 @3 | Precision @5 | Recall @5 | F1 @5 | Prediction Time |
|---|---|---|---|---|---|---|---|---|---|---|
| 2 | 0.5294 | 0.2968 | 0.3803 | 0.2471 | 0.4155 | 0.3099 | 0.1602 | 0.4491 | 0.2362 | 45 secs |
| 3 | 0.5367 | 0.3008 | 0.3855 | 0.2509 | 0.4219 | 0.3146 | 0.1631 | 0.4571 | 0.2404 | 116 secs |

INFORMATION PROCESSING DEVICE, METHOD FOR GENERATING LEARNING MODEL, AND COMPUTER-READABLE STORAGE MEDIUM THAT STORES PROGRAM FOR GENERATING LEARNING MODEL

BACKGROUND

1. Field

The present disclosure relates to an information processing device, a method for generating a learning model, and a computer-readable storage medium that stores a program for generating a learning model.

2. Description of Related Art

Japanese Laid-Open Patent Publication No. 2010-33377 discloses a search method for assigning an attribute of a search request to a query. In this method, training data is generated based on a click log. The click log includes a query that has been input for web search and a click URL selected from a list of search results. The training data is used for machine learning that estimates a search request attribute of the query.

To create a machine learning model used for search engine, actual click logs are generally used for training data as described above. However, for example, when the number of search targets is relatively large as in a shopping website that offers a variety of products, the log of a target with a relatively low search frequency may be unable to be sufficiently obtained. As a result, a desired prediction accuracy may be unable to be obtained.

An object of the present disclosure is to provide an information processing device for generating a learning model, a method for generating a learning model, and a computer-readable storage medium that stores a program for generating a learning model that provide a relatively high prediction accuracy even when the number of search targets is relatively large.

SUMMARY

This Summary is provided to introduce a selection of concepts in a simplified form that are further described below in the Detailed Description. This Summary is not intended to identify key characteristics or essential characteristics of the claimed subject matter, nor is it intended to be used as an aid in determining the scope of the claimed subject matter.

An information processing device according to an aspect of the present disclosure is an information processing device that generates a learning model. The learning model is configured to output attribute information of a target based on a search query that has been input to search for the target. The information processing device includes one or more processors and one or more memories. At least one of the one or more memories stores target data. The target data includes target datasets. Each of the target datasets includes, as a target data field, identification information of the target and the attribute information of the target. At least one of the one or more processors is configured to execute a process that updates some of parameters included in the learning model by giving the target data to one or more training tasks and executing the one or more training tasks.

A method according to an aspect of the present disclosure is a method for generating a learning model executed by an information processing device. The learning model is configured to output attribute information of a target based on a search query that has been input to search for the target. The method includes obtaining target data. The target data including target datasets. Each of the target datasets includes, as a target data field, identification information of the target and the attribute information of the target. The method further includes defining one or more training tasks and updating some of parameters included in the learning model by giving the target data to the one or more training tasks and executing the one or more training tasks.

A computer-readable storage medium according to an aspect of the present disclosure stores a program for generating a learning model. The learning model is configured to output attribute information of a target based on a search query that has been input to search for the target. The program is configured to cause one or more computers to obtain target data. The target data includes target datasets. Each of the target datasets includes, as a target data field, identification information of the target and the attribute information of the target. The program is further configured to cause the one or more computers to update some of parameters included in the learning model by giving the target data to one or more training tasks and executing the one or more training tasks.

Other features and aspects will be apparent from the following detailed description, the drawings, and the claims.

BRIEF DESCRIPTION OF DRAWINGS

FIG. 1 is a diagram showing the configuration of a system including an information processing device according to an embodiment.

FIG. 2 is a diagram illustrating an example of a target table in the embodiment.

FIG. 3 is a diagram illustrating an example of a log table in the embodiment.

FIG. 6 is a diagram illustrating search tasks in the embodiment.

FIG. 7 is a diagram illustrating attribute tasks in the embodiment.

FIG. 8 is a diagram illustrating genre tasks in the embodiment.

FIG. 11 is a table showing the result of a second experiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 5:
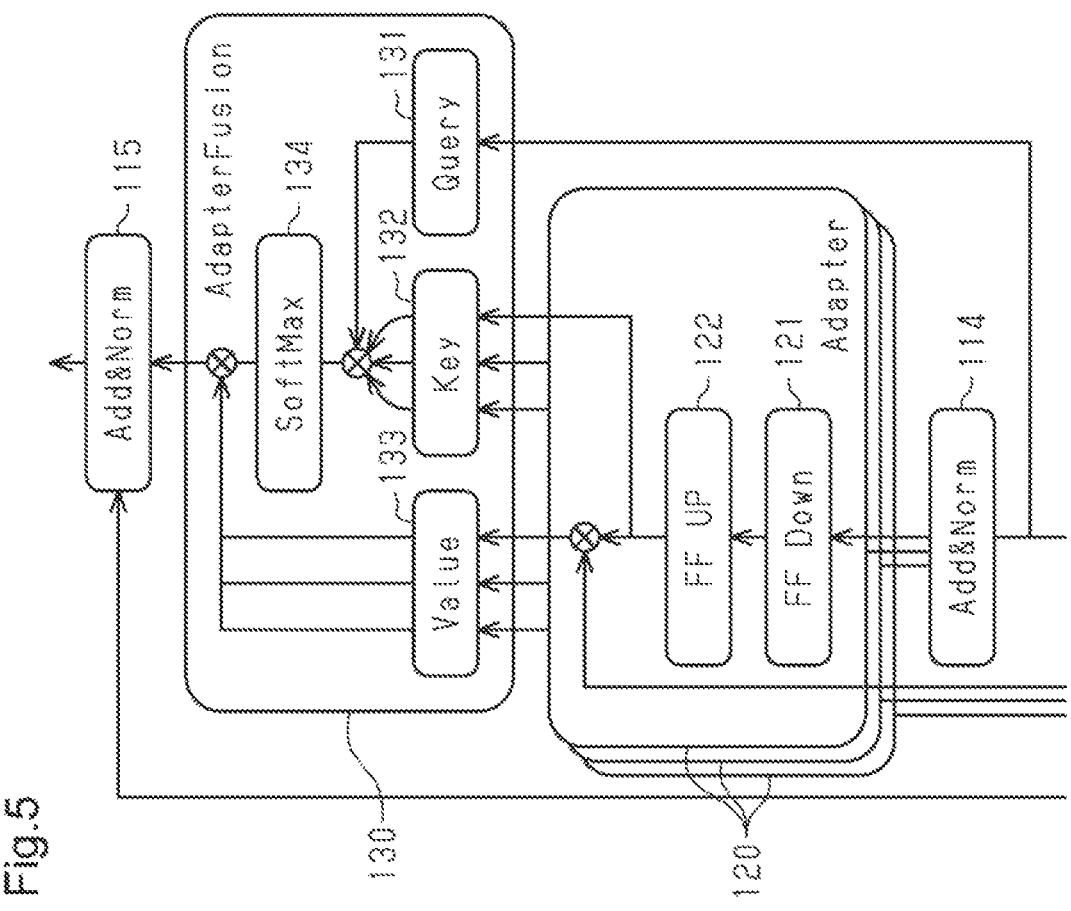
FIG. 5 is a diagram illustrating the adapter modules and adapter fusion layer included in FIG. 4.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Examples of an information processing device for generating a learning model, a method for generating a learning model, and a computer-readable storage medium that stores a program for generating a learning model according to the present disclosure will now be described with reference to the drawings.

Overview of System

Figure 1:
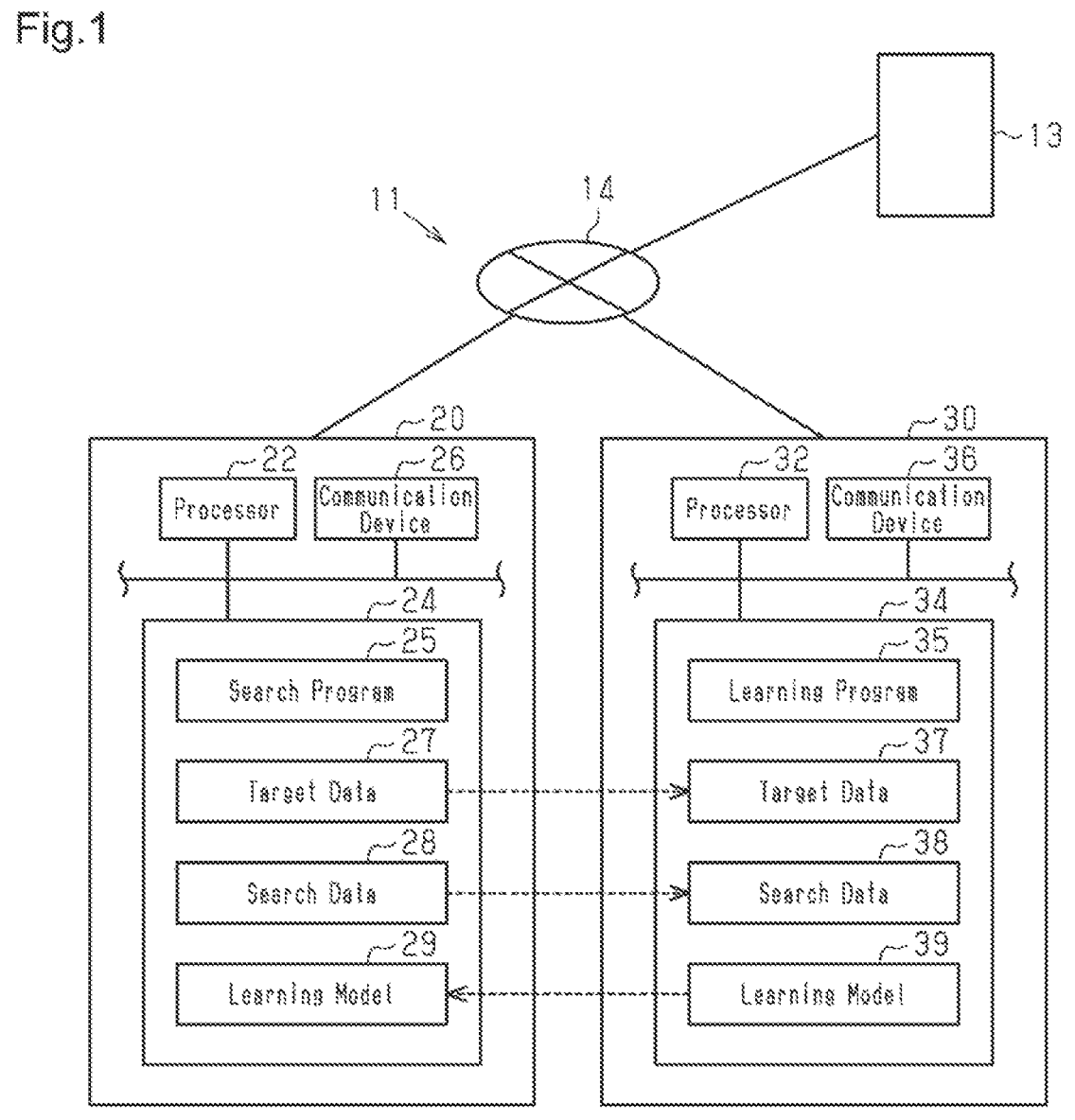

As shown in FIG. 1, a system 11 of the present disclosure includes a search server 20 and an information processing device 30. The system 11 is used to generate a learning model, which will be described later. Each of the search server 20 and the information processing device 30 is an example of a computer. The search server 20 may provide a website having a search window (e.g., a text box) for searching for products or services. The website may be provided by a web server that is different from the search server 20.

The website presents information for offering various products or services. Examples of the website include a shopping website where products are sold. Examples of the products or services offered at the website include, but are not limited to, travel plans, accommodations, transportation tickets, event tickets, books, magazines, music, videos, movies, insurance, or securities. The product or service to be searched is hereinafter referred to as a target.

One or more terminals 13, the search server 20, and the information processing device 30 communicate with each other via a network 14. The terminal 13 is, for example, an information processing device such as a smartphone, a personal computer, or a tablet. The network 14 includes, for example, the Internet, a wide area network (WAN), a local area network (LAN), a provider terminal, a wireless communication network, a wireless base station, and a dedicated line. All the combinations of the devices shown in FIG. 1 do not necessarily have to communicate with one another. The network 14 may partially include a local network.

After accessing a website through each terminal 13, a user performs search for selecting a desired target from targets by inputting a word or phrase (one or more words or phrases) in the search window. A phrase input to the search window is referred to as a search query. The search server 20 infers the user's search intent from a search query and outputs a search results screen to the terminal 13. The search result may be, for example, displayed as a list of targets. The target displayed in the list may include, for example, a link to detailed information of each target. The search result may be a URL of a web page including information of each target. The search results screen is configured to allow the user to select a desired target from the list.

The search server 20 is a server device including a processor 22, a memory 24, and a communication device 26. The communication device 26 enables communication with other devices such as the terminal 13, the information processing device 30, and a web server via the network 14.

The memory 24 stores a search program 25, target data 27, and search data 28. Further, the memory 24 stores a learning model 29 obtained from the information processing device 30. The search data 28 includes a search query that has been input by the user and attribute information of a target selected based on a search result. Details of the search data 28 will be described later.

The information processing device 30 includes a processor 32, a memory 34, and a communication device 36. The information processing device 30 is, for example, a computer such as a server device. The communication device 36 enables communication with other devices, for example, the terminal 13 and the search server 20 via the network 14. The memory 34 stores a learning program 35 for machine learning and a generated learning model 39. The processor 32 of the information processing device 30 generates the learning model 39 by executing the learning program 35, which is stored in the memory 34. The learning model 39 infers the user's search intent from an input search query and outputs target attribute information.

The information processing device 30 obtains the target data 27 and the search data 28 from the search server 20 on a regular basis, at a specific time, or in real time, and stores them in the memory 34 as target data 37 and search data 38. The information processing device 30 may obtain each of the target data 27 and the search data 28 at a different time. The information processing device 30 may obtain the target data 27 and the search data 28 via a component other than the search server 20, such as a computer, a server, or a storage. In order to distinguish from the target data 27 and the search data 28 updated at any time in the search server 20, the data stored in the information processing device 30 is referred to as the target data 37 and the search data 38.

The target data 37 and the search data 38 are used as training data for generating the learning model 39. All of the target data 37 and the search data 38 do not have to be used as training data. Instead, some of them selected at random or under a specific condition may be used as training data.

After generating the learning model 39, the information processing device 30 may newly obtain the target data 27 and the search data 28 as the target data 37 and the search data 38, respectively. Then, the parameters of the learning model 39 may be updated by performing additional training using new target data 37 and new search data 38. In order to distinguish from the learning model 39 updated in this manner, the learning model stored in the search server 20 is referred to as the learning model 29. If the learning model 39 is not updated, the learning model 39 is substantially equal to the learning model 29.

The processors 22, 32 each include an arithmetic unit such as a CPU, a GPU, and a TPU. The processors 22, 32 are processing circuitry configured to execute various software processes. The processing circuitry may include a dedicated hardware circuit (e.g. ASIC) used to process at least some of the software processing. That is, the software processing simply needs to be executed by processing circuitry that includes at least one of a set of one or more software processing circuits and a set of one or more dedicated hardware circuits.

Each of the memories 24, 34 is a computer-readable medium. The memories 24, 34 may each include, for example, a non-transitory storage medium such as a random access memory (RAM), a hard disk drive (HDD), a flash memory, and a read-only memory (ROM). The processors 22, 32 execute a series of instructions included in the programs stored in the memories 24, 34, respectively, upon a given signal or upon satisfaction of a predetermined condition.

Search System

As shown in FIG. 2, the target data 27 includes, for example, a catalog table 27T (see FIG. 2) of a target. The catalog table 27T of FIG. 2 includes target datasets P1, P2, . . . Pt. FIG. 2 illustrates a first target dataset P1 and a second target dataset P2.

The catalog table 27T includes, as a target data field, for example, the title of each target and an attribute and an attribute value for the attribute of the target. An attribute and an attribute value for the attribute are hereinafter described as "attribute::attribute value." The catalog table 27T may further include a genre path as a target data field.

As shown in FIG. 2, the title may include, for example, the name, brand name, size, or color of a target, but is not limited thereto. The title may be, for example, a relatively long character string that includes all of the name, brand name, size, and color. Thus, the title may include multiple pieces of information indicating attributes (for example, a name, a brand name, a size, a color, and the like) of a target. In addition, the title may include, for example, an advertising phrase for sales promotion, which is not the attribute of a product, such as "recommended," "free shipping," and "10× points." This allows the target provider to include, in the title, an advertising phrase for prompting the user to make a selection. The title may have a character limit. Since the title includes the name of a target, the title is used as identification information of the target. In addition, the target data field may include identification information (e.g., the name of each target), instead of the title of the target.

The attribute is the category or type of a target. The attribute value indicates a specific content of the attribute. Examples of the "attribute::attribute value" include, but are not limited to, "color::black," "representative color: gray," and "brand name::RKTN," as shown in the first target dataset P1. Multiple attributes can be set for each target. The number of set attributes may differ depending on the target. In addition, different attributes can be set depending on the target. A pair of an attribute and an attribute value is used as attribute information.

The genre path represents the classification of multiple targets according to their types in a hierarchy. The genre path indicates levels L1 to L5 to which each target belongs. The levels L1 to L5 may be set by a website provider. In this example, up to five levels can be set, but the number of layers is not limited thereto. The first level L1 (i.e., the topmost level) is the largest classification. As the levels descend, the targets are classified in more detail.

As shown in FIG. 2, the order of levels can be expressed as the first level L1>the second level L2>the third level L3> . . . . The targets do not necessarily have to be set to the lowermost layer. When the genre path is set, the user can reach a desired target by following the classification in the level of layers.

For instance, in the example of the first target dataset P1, the male running wear of the target "RKTN" is set to levels including the first level L1: sports/outdoors, the second level L2::jogging/marathon, the third level L3::wear, and the fourth level L4::menswear, but is not set to the fifth level L5. In the example of the second target dataset P2 in FIG. 2, the target "smartphone case" is set to the first level L1::smartphone/tablet, the second level L2::smartphone/mobile phone accessories, and the third level L3::case/cover, but is not set to the fourth level L4 or the fifth level L5.

As shown in FIG. 3, the search data 28 includes, for example, a log table 28T. The log table 28T of FIG. 3 includes search datasets S1, S2, . . . Sq. FIG. 3 illustrates a first search dataset S1 and a second search dataset S2.

The search server 20 accumulates search logs of each search in the log table 28T as search datasets S1, S2, . . . . The log table 28T includes, as the search data field, an input search query and the attribute::attribute value of a target selected from the result of search based on the search query. The search data 28 including search datasets accumulated in this manner is stored in the memory 24. When the number (type) of targets is relatively large, or for a while after a search service is started, the number of target datasets tends to be larger than that of search datasets.

By executing the search program 25, the processor 22 executes a search step of searching the target data 27 based on a search query and an output step of outputting search results. By executing the search program 25, the processor 22 may further execute a recording step of recording the attribute::attribute value of the target selected by the user as a search log in the memory 24 after the output step.

The search results reflect the result of prediction performed by the learning model 29. For example, when a search query is input, the learning model 29 is configured to output the attribute::attribute value of a target that is highly related to the input search query as a prediction result that is consistent with the search intent. That is, the target task of each of the learning models 29, 39 is to output the attribute::attribute value of the target consistent with the search intent of a search query input to search for the target.

The output of the target task of the learning models 29, 39 may be an attribute value. However, even if the same attribute values is used, the attribute corresponding to its attribute value may differ depending on the type of a target. For example, if the target is aromatic oil, the attribute corresponding to the attribute value "orange" is highly likely to be "aroma." If the target is clothing, the attribute corresponding to the attribute value "orange" is highly likely to be "color." Thus, a result that is more consistent with a search intent can be produced by setting the output of the target task to "attribute::attribute value." When the output of the target task of the learning models 29, 39 is only an attribute value, it is desirable to be able to infer which attribute (e.g., brand name) the attribute value indicates.

Learning Model

Figure 4:
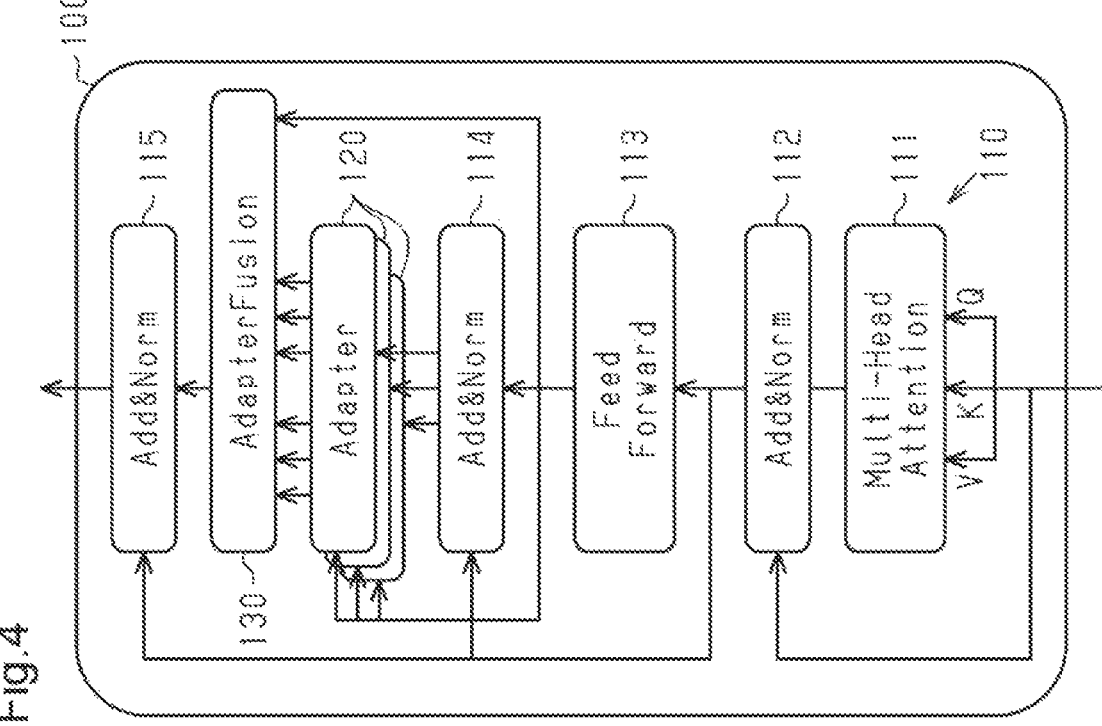
FIG. 4 is a diagram illustrating a neural network in the embodiment.

FIG. 4 shows a neural network 100 that generates the learning model 29. The neural network 100 refers to a learning model in which at least some of the parameters are not finally.

The neural network 100 includes, for example, a pre-trained model 110, adapter modules 120, and an adapter fusion layer 130. The pre-trained model 110, the adapter modules 120, and the adapter fusion layer 130 are provided, for example, via the Internet.

The pre-trained model 110 is, for example, Bidirectional Encoder Representations from Transformers (BERT) that is trained to understand the context of an input language.

However, the configuration of the pre-trained model 110 is not limited thereto. In BERT, unlabeled datasets can be processed. The pre-trained model 110 includes parameters θ that are adjusted by training. The training data used in BERT pre-training is, for example, a large general-purpose corpus including unlabeled texts.

BERT includes, for example, a multi-head attention layer 111, a feedforward layer 113, and addition-and-normalization layers 112, 114, 115. The addition-and-normalization layers 112, 114, 115 are located after the multi-head attention layer 111, the feedforward layer 113, and the adapter fusion layer 130, respectively.

In the multi-head attention layer 111, feature extraction is performed using an attention structure. For example, each of input words is converted into a vector representation. Then, three parameters, namely, a query (Q), a key (K), and a value (V) are calculated for each word. The query is a query in the attention mechanism, and is different from the query in the above search query. The value is the value of the key. Next, the similarity between the words is calculated from, for example, the inner product of the query and the key. Thus, the anaphoric relationship between the input words is obtained. Then, the similarity is used as a weight to output a value indicating the anaphoric relationship between query and the value. In the multi-head attention layer 111, multiple patterns of relationships can be simultaneously learned by combining such attention structures in parallel.

The feedforward layer 113 is a fully connected neural network having a two-layer structure. In the feedforward layer 113, first, a process is performed to weight the input, add a bias to the input, and then apply the result to an activation function (e.g., rectified linear unit (ReLU)). This output is weighted and a bias is further added. In this process, since individual forward propagation is performed for each word, parallel processing is performed without being affected by words.

Addition in the addition-and-normalization layer means residual connection. For example, the output of the layer 112, which is prior to the layer 113, is added to the output of the layer 113. Normalization means layer normalization. Normalization mitigates gradient vanishing and gradient exploding, thereby allowing for efficient learning.

The adapter modules 120 are added within the pre-trained model 110 for the purpose of fine-tuning. By removing the added adapter modules 120, the original pre-trained model 110 is restored. Additionally, additional adapter modules 120 may be added later, or the adapter modules 120 may be replaced with other adapter modules 120.

As shown in FIG. 5, each adapter module 120 includes, for example, a feedforward down-projection (FF Down) layer 121 and a feedforward up-projection (FF Up) layer 122. After the down-projection layer 121, processing may be performed using an activation function (e.g., ReLU).

The adapter fusion layer 130 is also added within the pre-trained model 110 for the purpose of fine-tuning. The pre-trained adapter fusion layer 130, as well as the adapter modules 120, can be removed from the learning model 39 or incorporated into the learning model 39 again.

The neural network 100 is subjected to first fine-tuning performed by the adapter modules 120 and second fine-tuning performed by the adapter fusion layer 130. The adapter fusion layer 130 is configured to receive the outputs of the adapter modules 120 and fuse them together.

As shown in FIG. 5, the parameters w of the adapter fusion layer 130 include a query 131, a key 132, and a value 133. The query 131 receives, as an input, the output of the weight of pre-trained model 110 from the layer 113. The key 132 and value 133 receive, as inputs, the outputs of the adapter modules 120.

The inner product of the query and all keys is input to a softmax function 134. The softmax function converts an input to produce an output where the sum of multiple output values equals 1.0 (or 100%). Thus, the weights of the adapter modules 120 are learned. Then, a value corresponding to a weight is obtained from the inner product of these weights (which can also be referred to as relevance or importance) and the value. In the addition-and-normalization layer 115, the output of the adapter fusion layer 130 is added to the output of the addition-and-normalization layer 112 and they are normalized.

Fine-Tuning Method

In the first fine-tuning, each adapter module 120 is trained by a corresponding training task to update parameters specific to that training task. Each adapter module 120 is configured to update the parameters φ of that adapter module 120 without changing the parameters θ of the pre-trained model 110.

Each adapter module 120 updates the parameters φ by solving an optimization problem for the training task. More specifically, training data is provided to the training task to calculate a loss (i.e., the difference between a correct value and a predicted value) using a loss function, and a parameter φ that minimizes the value of the loss is determined. The number of training tasks is equal to the number of the adapter modules 120. Thus, each adapter module 120 corresponds to one training task. The training data is selected for each training task. FIGS. 6 to 8 show examples of training tasks. For example, if eleven training tasks are defined as shown in FIGS. 6-8, the neural network 100 includes eleven adapter modules 120.

As shown in FIG. 6, one or more training tasks may include one or more (three in FIG. 6) attribute tasks 52. The training tasks may include at least one or more (three in FIG. 7) search intent tasks 51 or at least one or more (five in FIG. 8) genre tasks 53, in addition to or instead of the one or more attribute tasks 52. The search data 28 is given to the search intent task 51 as training data. The target data 27 is given to the attribute task 52 and the genre task 53 as training data.

As shown in FIG. 6, one or more search intent tasks 51 may include a first search task Slav, a second search task 51a, and a third search task 51v. The first search task Slav is configured to receive a search query and output an attribute::attribute value. The second search task 51a is configured to receive a search query and output an attribute. The third search task 51v is configured to receive a search query and output an attribute value.

As shown in FIG. 7, one or more attribute tasks 52 may include a first attribute task 52av, a second attribute task 52a, and a third attribute task 52v. The first attribute task 52av is configured to receive a title and output an attribute::attribute value. The second attribute task 52a is configured to receive a title and output an attribute. The third attribute task 52v is configured to receive a title and output an attribute value.

As illustrated in FIG. 8, one or more genre tasks 53 may include a first genre task 53a to a fifth genre task 53e. The first genre task 53a, the second genre task 53b, the third genre task 53c, the fourth genre task 53d, and the fifth genre task 53e are configured to respectively output levels L1 to L5 when inputting a title.

The second fine-tuning is performed as follows. The adapter fusion layer 130 updates its parameters ψ by solving an optimization problem without changing the parameters θ of the pre-trained model 110 or the parameters φ of the adapter module 120. More specifically, training data is provided to the training task to calculate a loss using a loss function, and a parameter w that minimizes the value of the loss is determined.

Method for Generating Learning Model

Figures 9, 10:
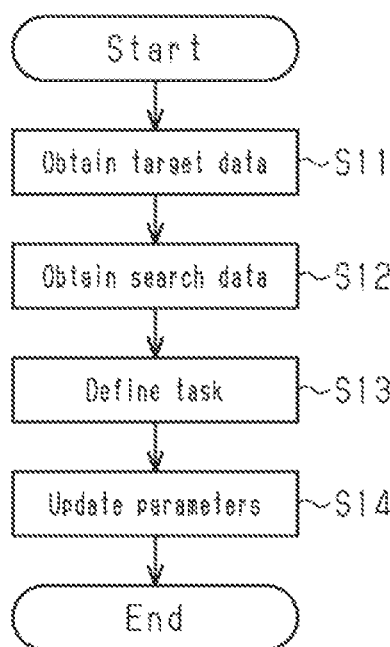
FIG. 9 is a flowchart illustrating a method for generating a learning model in the embodiment.
FIG. 10 is a table showing the result of a first experiment result.

FIG. 9 shows a procedure for generating the learning model 39. First, the information processing device 30 obtains the target data 27 (step S11). Further, when performing training with the search data 28, the information processing device 30 obtains the search data 28 (step S12). The search data 28 may be obtained for verification of the learning model 39.

One or more training tasks (a total of eleven training tasks including three search intent tasks 51, three attribute tasks 52, and five genre tasks 53 in the present disclosure) are defined in the information processing device 30 (step S13). The order of execution of steps S11 to S13 may be interchanged and some or all of them may be performed simultaneously.

Then, the parameters are updated in the information processing device 30 (step S14). More specifically, first, in the neural network 100, the search intent tasks 51 to the genre tasks 53, which are training tasks, are given the target data 37 and the search data 38. Then, training of the adapter modules 120 is performed individually or simultaneously. Thus, the parameters of the adapter modules 120 are determined.

Subsequently, the parameters of the adapter fusion layer 130 are updated. More specifically, for example, the target data 37 is provided as training data to perform training of the adapter fusion layer 130. Training of the adapter fusion layer 130 may be performed by providing search data 38. When the parameters of the adapter fusion layer 130 are determined, the learning model 39 is completed. The completed learning model 39 may verify the prediction accuracy of the target task.

Verification of Learning Model

FIGS. 10 and 11 show verification results of the learning model 39 and two preliminary examination models. Each of the verification results is indicated by an evaluation value when the attribute::attribute value is predicted from the target task (i.e., search query). In FIGS. 10 and 11, Precision@N (N=1, 3, 5) indicates the precision at the top N ranks. Similarly, Recall@N (N=1, 3, 5) indicates the recall at the top N ranks, and F1 @N (N=1, 3, 5) indicates the F-measure at the top N ranks. In the experiments showing the results in FIGS. 10 and 11, the number of datasets of the target data 37 used as the training data is 197.83 million, and the number of datasets of the search data 38 is 2.26 million.

The evaluation values in FIGS. 10 and 11 are micro-averages, and the results of all classes are evaluated without weighting. Additionally, the search data 38 used for training has been filtered using a cosine similarity of greater than 0.7 between the search query input and the attribute::attribute value.

FIG. 10 shows the result of a first experiment that investigated the difference between training tasks. Preliminary examination models 1, 2 used for the verification are different from the neural network 100 of the present disclosure in that one adapter layer (not shown) is provided and the adapter fusion layer 130 is not provided. The configuration and function of the adapter layer is similar to those of the adapter module 120.

In the preliminary examination model 1, the search data 38 was given as training data, and the adapter layer was trained only by the first search task 51*av*, in which a search query was input and an attribute::attribute value was output. That is, in the preliminary examination model 1, the target task of the learning model 39 was used as a training task. The prediction using the preliminary examination model 1 is an experimental example 1.

In the preliminary examination model 2, the target data 37 was given as training data, and the adapter layer was trained only by the first attribute task 52*av*, in which a title was input and an attribute::attribute value was output. The prediction using the preliminary examination model 2 is an experimental example 2.

FIG. 10 indicates that the prediction accuracy of the preliminary examination model 2 is much higher than that of the preliminary examination model 1 for all of the precision, the recall, and the F-measure at the top rank. That is, when the same layer structure is used for the models, the prediction accuracy of the target task is higher when training is performed using the target data 37 as training data than the search data 38.

FIG. 11 shows the results of the second experiment. The experimental example 2 presents the result using the preliminary examination model 2, which performed well in the examination of FIG. 10. The learning model 39 was used for an experimental example 3. That is, the model (neural network 100) of the experimental example 3 includes the pre-trained model 110, eleven adapter modules 120, and the adapter fusion layer 130, and is trained by eleven training tasks (search intent tasks 51 to genre tasks 53) using the target data 37 and the search data 38.

Referring to FIG. 11, there was no variance in the prediction accuracy for each evaluation metric. For all evaluation values, the prediction accuracy of the experimental example 3 was higher than that of the experimental example 2. Accordingly, training with multiple training tasks leads to higher prediction accuracy than training with a single training task.

Operation of Present Disclosure

To increase the accuracy of a learning model, it is preferable to perform learning using a vast amount of training data. However, obtaining an optimal dataset for learning requires time and cost. Furthermore, each new learning session takes a considerable amount of time.

In this regard, the pre-trained model 110 has learned knowledge related to, for example, the language used for a search query. Addition of multiple adapter modules 120 and an adapter fusion layer 130 to the pre-trained model 110 results in effective fine-tuning of the neural network 100. In the method of the present disclosure, the learning model 39 with knowledge related to the search target is generated by adjusting the parameters using the target data 37.

In general, the number of parameters handled by the adapter modules 120 and the adapter fusion layer 130 is much smaller than the number of parameters of the pre-trained model 110. For example, the number of parameters of the adapter modules 120 is roughly a few percent of the number of parameters of the pre-trained model 110. This reduces calculation resources for fine-tuning and also reduces the storage capacity for storing parameters.

Adding the adapter modules 120 and the adapter fusion layer 130 to the neural network 100 does not alter the previously learned knowledge (parameters of the pre-trained model 110). Further, the adapter modules 120 and the adapter fusion layer 130 can be updated or removed from the neural network 100. Thus, the learning model 39 is readily improved by defining a desired training task based on the target and the target task. For example, when the target data fields of the target data 37 are different between personal products and corporate services, fine-tuning for the target is performed by exchanging the adapter modules 120 and the adapter fusion layer 130.

When there are many targets, targets with few search records are less likely to accumulate sufficient search data for training. This may lower the prediction accuracy. The use of the adapter module 120 allows training to be efficiently performed with less training data. Thus, the learning model

39 with high prediction accuracy is generated. Furthermore, when the target data 37 is used as training data, training data will not be lost because there is a corresponding attribute:: attribute value for each of all targets.

If multiple training tasks (search intent task 51 to genre task 53) are sequentially used for fine-tuning one by one, the knowledge is consecutively altered. This causes the previously learned knowledge to be lost. Thus, while the order of executing training tasks needs to be considered, it is not easy to properly set the order.

Another method is multi-task learning, which shares information across multiple tasks. However, in multi-task learning, retraining is necessary each time a new task is added. Further, in multi-task learning, it is difficult to train a model that equally addresses each task while maintaining a balance between multiple tasks.

In this regard, in fine-tuning using the adapter fusion layer 130, the order and balance of multiple task processes do not need to be considered. The use of the adapter fusion layer 130 allows a different weight to be given to each of the outputs of the adapter modules 120 in consideration of the relevance of the adapter modules 120.

The information contained in the title varies depending on the target. Thus, if the content of the target data 37 is different, there is a possibility that the effective training task may differ. In this regard, the adapter modules 120 and the adapter fusion layer 130 may be individually replaced or removed. This allows retraining to be efficiently performed by changing the configuration of the neural network 100, the training task, or the training data depending on the target.

There may be a particular correlation or relevance between a target and an attribute::attribute value. In particular, when the title includes an attribute or an attribute value, correlation or relevance is likely to occur between the title and the attribute or attribute value. Originally, the target data 27 is not labeled training data indicating the correct answer of a target task. However, the data of the target included in the title is correctly and directly related to the attribute:: attribute value of the target. In contrast, the search query may include information that can be noise for the attribute:: attribute value of the target that has been output as the search result.

In the present disclosure, the target data field and the search data field include an attribute::attribute value. This allows the title of the target data 37 to be used as a pseudo search query and allows the target data 37 to be used as training data similarly to the search data 38. By performing training using the target data 27, the relationship between the target and the attribute::attribute value is correctly learned. As a result, search results that are more consistent with the search intent are obtained.

Advantages of Present Disclosure

The present disclosure has the following advantages.

(1) The target data 37 is used as training data. This allows for efficient training of the learning model 39 even when the number of targets is relatively large or even when the search data 38 is not sufficiently accumulated. As a result, high prediction accuracy is achieved even when the number of targets is relatively large.

(2) By outputting a set of an attribute value and an attribute corresponding to the attribute value, the learning model 39 performs accurate prediction for various types of targets.

(3) The target data 37 is used to execute multiple attribute tasks 52 (52av, 52a, 52v).

(4) The search data 38 is used as training data to generate the learning model 39 with higher accuracy.

(5) The search data 38 is used to execute multiple search intent tasks 51 (51av, 51a, 51v).

(6) The target data 37 is used to execute multiple genre tasks 53 (53a to 53e).

(7) When the title (identification information) includes an attribute of the target and an attribute value corresponding to the attribute, a correlation occurs between the target data fields of the target data 37. Thus, the target data 37 is used for training to learn search targets.

(8) When the target is a product or service, the types of the target may vary. However, data loss does not occur because the target data 37 related to each target is used as training data.

(9) Advertising phrases included in a title frequently have little relevance to a target. Even in this case, more proper weighting is performed by performing training in at least one of the attribute task 52 and the genre task 53.

(10) High prediction accuracy is obtained by using the target data 37 with a relatively large number of datasets for training.

(11) The cost and time for generating the learning model 39 is significantly reduced by using the pre-trained neural network 100. In addition, fine-tuning is efficiently performed by the adapter module 120.

(12) The adapter fusion layer 130 allows a different weight to be given to each of the outputs of the adapter modules 120 in consideration of the relevance of each adapter module 120 to an input.

The present embodiment may be modified as follows. The present embodiment and the following modifications can be combined as long as they remain technically consistent with each other.

The entire learning model including natural language processing may be newly generated.

The neural network 100 does not have to include one or more of the adapter modules 120 or the adapter fusion layer 130. For example, there may be only one training task (e.g., the first attribute task 52av, which inputs a title and outputs an attribute::attribute value). In this case, the neural network 100 only needs to include one adapter module 120. When only one adapter module 120 is inserted into the neural network 100, the adapter fusion layer 130 is not necessary.

The number and content of training tasks may be changed. For example, three search intent tasks 51 or three attribute tasks 52 may be omitted. Alternatively, when the data 37, 38 includes another data field, a training task using the data field may be added. In addition, the number of genre tasks 53 may be changed according to the number of levels. If there is a common data field (for example, attribute::attribute value) between the search data 28 and the target data 27, the target data 27 is readily used as training data instead of, or in addition to the search data 28.

The neural network 100 does not have to include the adapter fusion layer 130. When there are multiple adapter modules 120 (training tasks), the training tasks may be sequentially processed to update parameters. Alternatively, multiple training tasks may be processed by multi-task learning.

The aspects understood from the above embodiment and the modifications are as follows.

[Aspect 1] An information processing device that generates a learning model, the learning model being configured to output attribute information of a target based on a search query that has been input to search for the target, where the information processing device includes one or more processors and one or more memories, at least one of the one or more memories stores target data, the target data includes target datasets, each of the target datasets including, as a target data field, identification information of the target and the attribute information of the target, and at least one of the one or more processors is configured to execute a process that updates some of parameters included in the learning model by giving the target data to one or more training tasks and executing the one or more training tasks.

[Aspect 2] The information processing device according to aspect 1, where the attribute information includes an attribute of the target and an attribute value for the attribute, the one or more training tasks include at least one of:

a first attribute task configured to receive the identification information and output the attribute value and the attribute corresponding to the attribute value;

a second attribute task configured to receive the identification information and output the attribute; and a third attribute task configured to receive the identification information and output the attribute value.

[Aspect 3] The information processing device according to aspect 1 or 2, where at least one of the one or more memories stores search data, the search data includes search datasets, each of the search datasets including, as a search data field, the input search query and the attribute information of the target selected from a result of search based on the search query, and at least one of the one or more processors is configured to execute a process that updates some of the parameters by giving the search data to one or more training tasks and executing the one or more training tasks.

[Aspect 4] The information processing device according to aspect 3, where the attribute information includes an attribute of the target and an attribute value for the attribute, the one or more training tasks that are given the search data include at least one of:

a first search intent task configured to receive the search query and output the attribute value and the attribute corresponding to the attribute value;

a second search intent task configured to receive the search query and output the attribute; and a third search intent task configured to receive the search query and output the attribute value.

[Aspect 5] The information processing device according to any one of aspects 1 to 4, where each of the target datasets further includes, as the target data field, a genre path for classifying the target, the genre path indicates levels to which the target belongs, the one or more training tasks that are given the target data include genre tasks, and each of the genre tasks is configured to receive the identification information and output a corresponding one of the levels.

[Aspect 6] The information processing device according to any one of aspects 1 to 5, where the identification information includes one or more of a name of the target, one or more attributes of the target, and an attribute value corresponding to each of the attributes.

[Aspect 7] The information processing device according to any one of aspects 1 to 6, where the target is a product or service.

[Aspect 8] The information processing device according to aspect 7, where the identification information includes an advertising phrase for a sale of the product or service.

[Aspect 9] The information processing device according to aspect 5 and any one of aspects 6 to 8 depending on aspect 5, where the number of the target datasets is greater than the number of the search datasets.

[Aspect 10] The information processing device according to any one of aspects 1 to 9, where the learning model includes a pre-trained neural network for natural language processing and one or more adapter modules, and each of the training tasks is configured to update a parameter of a corresponding one of the adapter modules.

[Aspect 11] The information processing device according to aspect 10, where the one or more training tasks include multiple training tasks, the learning model includes the adapter modules, and the learning model includes an adapter fusion layer configured to combine received output results into one when receiving outputs of the adapter modules.

[Aspect 12] A method for generating a learning model executed by an information processing device, the learning model being configured to output attribute information of a target based on a search query that has been input to search for the target, the method including:

obtaining target data, the target data including target datasets, each of the target datasets including, as a target data field, identification information of the target and the attribute information of the target;

defining one or more training tasks; and updating some of parameters included in the learning model by giving the target data to the one or more training tasks and executing the one or more training tasks.

[Aspect 13] A program for generating a learning model, the learning model being configured to output attribute information of a target based on a search query that has been input to search for the target, where the program causes one or more computers to:

obtain target data, the target data including target datasets, each of the target datasets including, as a target data field, identification information of the target and the attribute information of the target; and update some of parameters included in the learning model by giving the target data to one or more training tasks and executing the one or more training tasks.

[Aspect 14] A computer-readable medium that stores the program according to aspect 13.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An information processing device that generates a learning model, the learning model being configured to output attribute information of a target based on a search query that has been input to search for the target, wherein
the information processing device includes one or more processors and one or more memories,
at least one of the one or more memories stores target data,
the target data includes target datasets, each of the target datasets including, as a target data field, identification information of the target and the attribute information of the target, and
at least one of the one or more processors is configured to execute a process that updates some of parameters included in the learning model by giving the target data to one or more training tasks and executing the one or more training tasks,
the learning model includes a pre-trained neural network for natural language processing and one or more adapter modules corresponding to the one or more training tasks, respectively, and
each of the adapter modules is configured to be trained by a corresponding training task to update a parameter specific to that training task without changing the parameters of the pre-trained model.

2. The information processing device according to claim 1, wherein
the attribute information includes an attribute of the target and an attribute value for the attribute,
the one or more training tasks include at least one of:
a first attribute task configured to receive the identification information and output the attribute value and the attribute corresponding to the attribute value;
a second attribute task configured to receive the identification information and output the attribute; and
a third attribute task configured to receive the identification information and output the attribute value,
wherein the one or more adapter modules include three adapter modules corresponding to the first, second, and third attribute tasks, respectively.

3. The information processing device according to claim 1, wherein
at least one of the one or more memories stores search data,
the search data includes search datasets, each of the search datasets including, as a search data field, the input search query and the attribute information of the target selected from a result of search based on the search query,
the one or more training tasks include one or more search intent tasks, and
at least one of the one or more processors is configured to execute a process that updates some of the parameters of the corresponding adapter module by giving the search data to the one or more search intent tasks and executing the one or more search intent tasks.

4. The information processing device according to claim 3, wherein
the attribute information includes an attribute of the target and an attribute value for the attribute,
the one or more search intent tasks that are given the search data include at least one of:
a first search intent task configured to receive the search query and output the attribute value and the attribute corresponding to the attribute value;

a second search intent task configured to receive the search query and output the attribute; and
a third search intent task configured to receive the search query and output the attribute value.

5. The information processing device according to claim 3, wherein the number of the target datasets is greater than the number of the search datasets.

6. The information processing device according to claim 1, wherein
each of the target datasets further includes, as the target data field, a genre path for classifying the target,
the genre path indicates levels to which the target belongs,
the one or more training tasks that are given the target data include genre tasks, and
each of the genre tasks is configured to receive the identification information and output a corresponding one of the levels.

7. The information processing device according to claim 1, wherein the identification information includes one or more of a name of the target, one or more attributes of the target, and an attribute value corresponding to each of the attributes.

8. The information processing device according to claim 1, wherein the target is a product or service.

9. The information processing device according to claim 8, wherein the identification information includes an advertising phrase for a sale of the product or service.

10. The information processing device according to claim 1, wherein
the one or more training tasks include multiple training tasks,
the learning model includes the adapter modules, and
the learning model includes an adapter fusion layer configured to combine received output
results into one when receiving outputs of the adapter modules, wherein the adapter fusion layer is configured to update its parameter without changing the parameters of the pre-trained model and the parameters of the adapter modules for fine-tuning.

11. A method for generating a learning model executed by an information processing device, the learning model being configured to output attribute information of a target based on a search query that has been input to search for the target, the method comprising:
obtaining target data, the target data including target datasets, each of the target datasets including, as a target data field, identification information of the target and the attribute information of the target;
defining one or more training tasks; and
updating some of parameters included in the learning model by giving the target data to the one or more training tasks and executing the one or more training tasks,
wherein the learning model includes a pre-trained neural network for natural language processing and one or more adapter modules corresponding to the one or more training tasks, respectively, and
wherein each of the adapter modules is configured to be trained by a corresponding training task to update a parameter specific to that training task without changing the parameters of the pre-trained mode.

12. A non-transitory computer-readable storage medium that stores a program for generating a learning model, the learning model being configured to output attribute information of a target based on a search query that has been input to search for the target, wherein the program is configured to cause one or more computers to:

obtain target data, the target data including target datasets, each of the target datasets including, as a target data field, identification information of the target and the attribute information of the target; and update some of parameters included in the learning model by giving the target data to one or more training tasks and executing the one or more training tasks, wherein the learning model includes a pre-trained neural network for natural language processing and one or more adapter modules corresponding to the one or more training tasks, respectively, and wherein each of the adapter modules is configured to be trained by a corresponding training task to update a parameter specific to that training task without changing the parameters of the pre-trained model.

\* \* \* \* \*